| United States Patent [19] | [11] | 4,119,640 |
|---|---|---|
| Hodakowski et al. | [45] | Oct. 10, 1978 |

[54] POLYMERIZABLE EPOXIDE-MODIFIED COMPOSITIONS

[75] Inventors: Leonard Edward Hodakowski, St. Albans; Clairborn Lee Osborn, Charleston, both of W. Va.; Edward Bruce Harris, Spring Valley, N.Y.

[73] Assignee: Union Carbide Corporation, New York, N.Y.

[21] Appl. No.: 594,670

[22] Filed: Jul. 10, 1975

[51] Int. Cl.² .................. C07C 69/54; C07D 319/04
[52] U.S. Cl. ................... 260/340.7; 260/410; 260/404; 260/405.5; 260/404.8
[58] Field of Search ............... 260/486 B, 476 R, 410, 260/340.7, 404, 405.5, 404.8

[56] References Cited
U.S. PATENT DOCUMENTS

| 3,494,939 | 2/1970 | Smith et al. | 260/486 B |
|---|---|---|---|
| 3,676,398 | 7/1972 | D'Alelio | 260/486 B |
| 3,690,927 | 9/1972 | Parker | 260/486 B |
| 3,785,849 | 1/1974 | Parker | 260/486 B |
| 3,872,162 | 3/1975 | Radlove | 260/486 B |

*Primary Examiner*—Paul J. Killos
*Attorney, Agent, or Firm*—Francis M. Fazio

[57] ABSTRACT

Polymerizable reaction product mixtures are prepared by the reaction of an epoxide of a long chain (1) unsaturated fatty oil or (ii) unsaturated fatty acid or ester thereof with a mixture of (a) acrylic acid or methacrylic acid, (b) a diepoxide, and (c) at least one other modifying compound. The modifying compounds contain a group that will react with the epoxidized fatty oil or with the epoxidized fatty acid or ester. The mixtures produced are useful per se and in formulations as inks or coatings that are curable by exposure to radiation or by heating.

25 Claims, No Drawings

POLYMERIZABLE EPOXIDE-MODIFIED COMPOSITIONS

BACKGROUND OF THE INVENTION

Over the past few years an extensive amount of literature has been published relating to compositions that are essentially free of non-reactive volatile solvents that are useful as coatings and inks. There have been extensive efforts made to produce such compositions because of their non-polluting properties and their economic advantages. Many of these compositions can be cured by radiation means, while many are cured by thermal means or a combination of thermal and radiation means. These compositions have become known as 100 percent total solids compositions because of the essential absence of the volatile solvents therein, even though they may be liquid in character.

SUMMARY OF THE INVENTION

The instant invention is directed to polymerizable epoxide-modified compositions comprising the reaction product mixture of (a) a vinylated carboxylic acid such as acrylic acid or methacrylic acid, (b) an aliphatic epoxide which is an epoxide of a long chain unsaturated fatty acid or ester thereof or an epoxide of a long chain unsaturated fatty oil, (c) a diepoxide, and (d) a comodifier, all as hereinafter defined. These novel polymerizable compositions are produced by reacting the above four components in the ratios and quantities set forth below.

DESCRIPTION OF THE INVENTION

The compositions of this invention are the polymerizable reaction product mixtures obtained by the reaction of four basic reactants. These polymerizable reaction product mixtures can be used as obtained as ink compositions or as coating compositions, or they can be formulated with other components. When so used, the conventional additives, known to those skilled in the art, can be incorporated; such as pigments, dyes, stabilizers, antistats, fungicides, bactericides, photoinitiators, photosensitizers, activators, and the like. These additives are introduced in the conventional manner and in the conventional amounts and their identities, modes of addition and amounts used are well known to those skilled in the art and require no further elaboration herein. One can also, if desired, incorporate solvents; however the incorporation of a solvent in any appreciable quantity would then destroy the "100 percent solids" character of the composition. The polymerizable reaction product mixtures can be cured or dried by non-ionizing or ionizing radiation, or by thermal means, or a combination thereof. Typical non-ionizing radiation means are ultraviolet radiation procedures employing low, medium, or high pressure mercury lamps, many of which are commercially available and the technology concerning their use is regularly employed.

The vicinal acryloxy hydroxyl long chain fatty acid, fatty esters and fatty oil compounds, and polymers thereof, are well known and have been disclosed in U.S. Pat. No. 3,125,592 (Mar. 17, 1964), U.S. Pat. No. 3,224,989 (Dec. 21, 1965) and U.S. Pat. No. 3,256,225 (June 14, 1966). These compounds are generally prepared by the reaction of the epoxidized derivative of the long chain unsaturated fatty acid or ester thereof or fatty oil (herein also called aliphatic epoxides) with a vinylated compound such as acrylic acid or methacrylic acid. They have been found useful in the production of other intermediates. They have also been found of use in the production of radiation curable coating and ink compositions. However, in some applications, the coatings and ink compositions containing these aliphatic epoxides did not possess sufficiently acceptable properties or a sufficiently rapid rate of cure. It has, therefore, been considered desirable to modify them to obtain modified compositions having more desirable properties. This has now been accomplished with many of the polymerizable epoxide-modified compositions of this invention.

The novel polymerizable epoxide-modified compositions of this invention are the reaction product mixtures obtained. The term reaction product mixture, as used herein, is the polymerizable epoxide-modified composition obtained upon the completion of the reaction. It is a composite of many individual compounds and, because of its complex nature, it has been essentially impossible to isolate all of the individual components therein and identify each. Regardless thereof, the total reaction product mixture can be used and is the novel polymerizable epoxide-modified composition of this invention. This reaction product mixture is said to be a polymerizable epoxide-modified composition because it has been produced by reaction of the aliphatic epoxide and vinylated carboxylic acid with a diepoxide, it is further modified with the comodifier and the reaction product mixture is polymerizable when exposed to radiation or heat. As will be shown subsequently, the reaction product mixture is obtained by reaction of a mixture of all of the components together. It was found that this procedure must be followed to prepare a satisfactory polymerizable epoxide-modified reaction product mixture. When attempts were made to combine products obtained from separate reactions, one could not, generally, readily obtain a homogeneous blend since the products from the separate reactions were usually not soluble with each other. For example, in the reaction of acrylic acid with the 2-(3,4-epoxy cyclohexyl)-5,5-spiro-(3,4-epoxy-cyclohexane)-m-dioxane a solid acrylate was obtained as the product of the reaction. The reaction of epoxidized linseed oil and acrylic acid produced a liquid acrylate as the product. When these two products were mixed together at room temperature a heterogeneous mixture resulted, the solid acrylate would not dissolve in the liquid acrylate. Whereas, when a mixture of acrylic acid and the same diepoxide and epoxidized linseed oil was reacted, a liquid, homogeneous acrylate product was obtained that could be cured by radiation at a rapid rate.

The vinylated carboxylic acids that constitute one of the reactants used in the preparation of the polymerizable epoxide-modified reaction product mixtures are acrylic acid and methacrylic acid.

The aliphatic epoxides used in the preparation of the polymerizable epoxide-modified reaction product mixtures and constituting another reactant are the epoxides of the long chain unsaturated fatty acids or the esters thereof that have an aliphatic chain of from 10 to 24 carbon atoms and at least one oxirane group, or the epoxides of long chain unsaturated fatty oils having esterified aliphatic acid chains of from 10 to 24 carbon atoms wherein at least one of said esterified chains contains an oxirane group. These compounds are well known, with many of them being commercially available. Included are the epoxidized fatty oils such as epoxidized soybean oil, epoxidized corn oil, epoxidized castor oil, epoxidized cottonseed oil, epoxidized hempseed oil, epoxidized tall oil, epoxidized safflower oil, epoxidized peanut oil, epoxidized linseed oil, epoxidized olive oil, epoxidized cod oil, epoxidized herring oil, epoxidized menhaden oil, etc., the epoxidized unsaturated fatty acids or epoxidized esters of unsaturated long chain fatty acids such as the methyl or ethyl or butyl or decyl esters of 9,10-epoxystearic acid, the propyl or 2-ethylhexyl esters of 9,10,12,13-diepoxystearic acid, the phenyl ester of 5,6-epoxycapric acid, 9,10-epoxyricinoleic acid, 9,10-epoxypentacosic acid, 4,5-epoxydecyl-1-acetate, 9,10-epoxystearyl stearate, 9,10-epoxy-1-phenoxyoctadecane, 9,10-epoxystearic acid, 4,5-epoxydecanoic acid, 9,10-epoxyoctadecanoic acid, 9,10-epoxytetracosanoic acid, 8,9-epoxy-1-hydroxydecanoic acid, 9,10-epoxy-1-hydroxyoctadecanoic acid, 9,10-epoxytetracosanoic acid, 4,5-epoxy-1-chlorodecanoic acid, 9,10-epoxy-1-bromooctadecanoic acid, 9,10-epoxy-1-chlorotetracosanoic acid, 4,5-epoxy-1-nitrilodecanoic acid, 4,5-epoxy-1-aminododecanoic acid, 9,10-epoxy-1-methylaminooctadecanoic acid, 4,5-epoxy-1-carbamyldecanoic acid, 9,10-epoxycapric acid, 9,10-epoxyoctadecyl-1-propionate, as well as the alkyl or phenyl esters of the above epoxidized acids, and the like.

A modification of this invention is that wherein a mixture of two or more of said aliphatic epoxides is used in the absence of the hereinafter defined diepoxides, the epoxycycloalkyl diepoxides and the diglycidyl compounds.

The diepoxides constitute a further reactant used in the preparation of the polymerizable epoxide-modified compositions. This group includes the epoxycycloalkyl diepoxides having at least one epoxycycloalkyl group wherein the epoxycycloalkyl group has 5 or 6 ring carbon atoms or a diglycidyl compound wherein the glycidyl group is attached to a phenyl group via a —O— link. These diepoxides are well known to those skilled in the art and many are commercially available. Illustrative of suitable epoxycycloalkyl diepoxides one can mention 4-(1,2-epoxyethyl)-1,2-epoxycyclohexane, 3,4-epoxycyclohexylmethyl-3,4-epoxycyclohexane carboxylate, 2-(3,4-epoxycyclohexyl)-5,5-spiro(3,4-epoxycyclohexane)-m-dioxane, bis(3,4-epoxy-6-methylcyclohexylmethyl)adipate, bis(2,3-epoxycyclopentyl) ether, 2,2-bis(3,4-epoxycyclohexyl)propane, 1,2-5,6-diepoxy-4,7-hexahydromethanoindane, 1,2-bis[5-(1,2-epoxy)-4,7-hexahydromethanoindanoxy] ethane, and the like.

Among the suitable diglycidyl compounds one can mention 2,2-bis[p-(2,3-epoxypropoxy)phenyl] propane, 1,3-bis(2,3-epoxypropoxy)benzene, 2,2-bis[p-(2,3-epoxypropoxy)phenyl]-hexafluoropropane, 2,2-bis[p-2,3-(epoxypropoxy)phenyl]nonadecane, 1,4-bis(2,3-epoxypropoxy) propane, 1,2-bis(2,3-epoxy-2-methylpropoxy)ethane, 1,3-bis[3-(2,3-epoxypropoxy)propyl]tetramethyl disiloxane, polyepichlorohydrin di-(2,3-epoxypropyl)ether, polypropylene glycol di-(2,3-epoxypropyl)ether, 5,6-bis(2,3-epoxypropoxymethyl)-1,2,3,4,7,7-hexachloro-2-norbornene, 2,6-bis(2,3-epoxypropoxy)-p-dioxane, 2,6-bis(2,3-epoxypropoxy)norbornene, 2,2-bis[4-(2,3-epoxypropoxy)-3,5-dichlorophenyl]propane, 2,2-bis[4-(2,3-epoxypropoxy)-3,5-dibromophenyl]propane, 3,9-bis[2-(2,3-epoxypropoxy) phenylethyl]-2,4,8,10-tetraoxaspiro[5.5]undecane, 2,2-bis[4-(2,3-epoxypropoxy)cyclohexyl]propane, 2,2-bis(4-[3-chloro-2-(2,3-epoxypropoxy)propoxy]-cyclohexyl)- propane, di- or triglycidyl ester of linoleic dimer acid, and the like.

While some of the more well-known diepoxides have been named above, any diepoxide, substituted or unsubstituted, containing at least one cycloaliphatic epoxide group

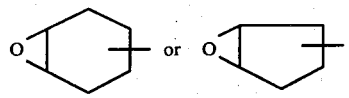

or at least one glycidyl group

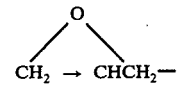

can be used to produce the polymerizable epoxide-modified reaction product mixtures of this invention.

One can also use diepoxides containing both of said oxirane groups, for example, 1,2-epoxy-6-(2,3-epoxypropoxy)hexahydro-4,7-methanoindane, p-(epoxycyclopentenyl) phenyl glycidyl ether, 1-(2,3-epoxypropoxy)phenyl-5,6-epoxyhexahydro-4,7-methanoindane, 1-(2,3-epoxycyclopentyl)-2-glycidyloxybenzene, and the like.

The fourth component or reactant used in preparing the polymerizable epoxide-modified compositions is the comodifier containing a reactive group. The reactive group in the comodifier is one that is capable of reacting with one of the functional groups of the above defined vinylated carboxylic acids, aliphatic epoxides or diepoxides, or functional groups formed during the reaction. These reactive-group-containing comodifiers can be (a) an aromatic carboxylic acid, wherein the aromatic group has six ring carbon atoms, (b) an aliphatic carboxylic acid having from 2 to 10 carbon atoms, preferably 2 to 5 carbon atoms, (c) the anhydrides of the above aromatic and carboxylic acids, (d) a phenol, (e) aromatic and aliphatic alcohols having from 1 to 10 carbon atoms, (f) an aliphatic carboxylic acid amide having from 2 to 10 carbon atoms in the chain, preferably 2 to 5 carbon atoms, or (g) an aliphatic carboxylic acid halide having from 2 to 15 carbon atoms in the chain, preferably 2 to 8 carbon atoms. These reactive-group-containing comodifiers can be substituted or unsubstituted with the substituent group being any group which will not interfere with the main reaction of the four principal reactants herein defined.

Illustrative of suitable comodifiers one can mention, benzoic acid, toluic acid, phthalic acid, tetrahydrophthalic acid, dimethylbenzoic acids, dioctylbenzoic acids, acetic acid, propionic acid, pentanoic acid, maleic acid, 2-ethylhexanoic acid, decanoic acid, oxalic acid, succinic acid, glutaric acid, adipic acid, sebacic acid, benzoic anhydride, phthalic anhydride, acetic anhydride, propionic anhydride, butyric anhydride, caproic anhydride, caprylic anhydride, capric anhydride, oxalic anhydride, malonic anhydride, glutaric anhydride, pimelic anhydride, azelaic anhydride, maleic anhydride, fumaric anhydride, phenol, 4-bromophenol, p-methoxyphenol, 2,4-diethylphenol, resorcinol, methanol, ethanol, propanol, benzyl alcohol, isopropanol, butanol, 2-ethylhexanol, 2,3-dimethylpentanol, isobutanol, 4-methyl-2-pentanol, 2,6-dimethyl-4-heptanol, 2,6,8-trimethyl-4-nonanol, decanol, acetamide, propionamide, valeramide, caproamide, caprylamide, benzamide, maleamide, succinamide, phthalamide, tetrahydrophthalamide, acetyl chloride, acetyl fluoride, butyryl bromide, benzoyl chloride, 2-ethylhexoyl chloride, enanthoyl chloride, cinnamyl alcohol, pentadecanoyl bromide, and the like.

It has been indicated that the reactive-group-containing comodifier is one that is capable of reacting with one of the functional groups of the three other reactants initially charged or with a functional group formed during the reaction. The functional group on the vinylated carboxylic acid is the carboxyl group; the functional group on the aliphatic epoxide and on the diepoxide is the epoxide group; these groups are initially present in the molecules referred to. It is known, however, that during the reaction hydroxyl groups are readily formed when an epoxide reacts with a vinylated carboxylic acid. This is shown by the equation

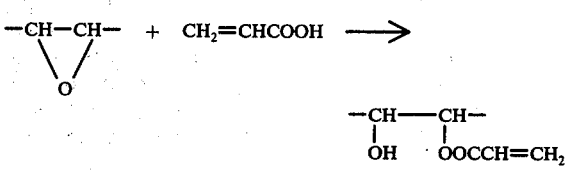

This results in the production of vicinal acryloxy hydroxyl derivatives of the oxirane compound of the type indicated in the patents previously referred to. The disclosures of said patents are incorporated herein by reference.

As previously indicated, the polymerizable epoxide-modified compositions are produced by reaction of the above-defined components. The concentration of each reactant charged will vary and is dependent upon the wishes of the individual and the final product desired. The amount of aliphatic epoxide charged is such that it contributes from 0.1 to one oxirane group equivalent per carboxyl group equivalent present in the vinylated carboxylic acid charged, preferably from 0.5 to one oxirane group equivalent thereof.

The amount of diepoxide charged is from 0.1 to one oxirane equivalent per carboxyl group equivalent of vinylated carboxylic acid charged, preferably from 0.5 to one oxirane group equivalent thereof.

The amount of reactive-group-containing modifier charged is from 0 to one reactive group equivalent per carboxylic group equivalent of vinylated carboxylic acid charged, preferably from 0.1 to 0.4 equivalent thereof.

The sum total of oxirane equivalents in the aliphatic epoxide and the diepoxide charged plus the reactive-group equivalents in the reactive-group-containing comodifier charged for the production of said polymerizable epoxide-modified reaction product mixture is from 0.1 to 1 equivalent per reacted carboxyl equivalent of the vinylated carboxylic acid, preferably from 0.5 to 0.9.

The reaction is carried out by heating the mixture of reactants at a temperature of from about 40° to 140° C., preferably from 90° to 120° C. The time required will, of course, vary depending upon the size of the batch and the particular reactants being charged, a fact well known in the chemical industry. In a typical reaction, a catalytic amount of catalyst is present sufficient to catalyze the oxirane group reaction and simultaneously an inhibitor is used to preclude excessive polymerization across the double bond of the vinylated carboxylic acid reactant. Typical catalysts are known to those skilled in the art and include for example, potassium hydroxide, potassium acetate, lithium hydroxide, barium hydroxide, calcium hydroxide, magnesium hydroxide, stannous octoate, uranyl nitrate hexahydrate, benzyl dimethylamine, triethylenediamine, tributyl phosphine, etc. Typical inhibitors include phenothiazine, hydroquinone, monomethyl ether of hydroquinone, 2,6-di-t-butyl-p-cresol, etc.

The manner or order of addition of the reactants to the reaction mixture in the reactor can be varied, as will be shown in the appended examples. Generally the aliphatic epoxide is charged to the reactor together with one or more of the other reactants and the catalyst and inhibitor are added at the appropriate time. Generally, the reaction is carried out in the presence of oxygen during that stage of the reaction when the vinylated carboxylic acid reactant is undergoing reaction so as to inhibit polymerization across the double bond.

Illustrative of the different modes by which one can produce the polymerizable epoxide-modified reaction product mixtures of this invention are those outlined below. These are merely illustrative and the procedures can be readily varied by one skilled in the art in light of the teachings herein.

In one mode the aliphatic epoxide and diepoxide are charged to the reactor, heated, and a mixture of the vinylated carboxylic acid and catalyst is added. After heating for a while in an oxygen atmosphere, an inhibitor and the comodifier are added and the reaction continued to completion.

In a second mode, the aliphatic epoxide and diepoxide are charged to the reactor; heated in air; the catalyst and then the vinylated carboxylic acid are added; reacted for a short period; the inhibitor and then the comodifier are added; and the reaction completed to completion.

A third mode is similar to the second mode, differing only in that the vinylated carboxylic acid is added before addition of the catalyst.

In a fourth mode the aliphatic epoxide, diepoxide and comodifier are added to the reactor; heated for a period of time; the vinylated carboxylic acid and catalyst are added; heated in air for a period of time; inhibitor added; and the reaction heated to completion.

In a fifth typical mode the aliphatic epoxide, diepoxide and comodifier are added to the reactor followed by the catalyst and the mixture is heated for a period of time with an air purge; then the vinylated carboxylic acid followed by the inhibitor are added and the reaction heated to completion.

The simplest procedure is to add all of the reactants, including catalyst and inhibitor, to the reactor and heating the mixture under proper atmospheric conditions to completion of the reaction.

The above are merely illustrative of some of the techniques that can be used. Generally, one skilled in the art can vary the procedure to best suit the particular combination of reactants being used and the product desired.

Any mode of addition can be used to suit the particular wishes of the experimentor. The completion of the reaction can readily be determined by monitoring the amount of unreacted vinylated carboxylic acid present in the mixture. The determination of the amount of acrylic acid or methacrylic acid remaining is carried out by conventional procedures known to those skilled in the art.

The preferred polymerizable epoxide-modified reaction product mixtures are those having minimal amount of free residual vinylated carboxylic acid therein, generally less than about 3 percent by weight of the total composition, preferably between 0.5 to 1.5 percent.

The polymerizable epoxide modified compositions of this invention are generally liquid materials that can be used per se or in formulated compositions as inks or coatings. They are cured to a non-tacky form by radiation means, ionizing or non-ionizing, or by thermal cure. The liquid reaction product mixtures produced have Brookfield viscosities of from about 500 to 10,000, preferably from 500 to 4,000 poises at room temperature.

When they are to be cured by non-ionizing or light radiation means, photosensitizers or photoinitiators are added thereto. These are generally present at concentrations of from 0.1 to 10 weight percent of the composition to be cured, preferably from 0.5 to 5 weight percent. Any of the known photoinitiators can be used and illustrative thereof one can mention 2,2-diethoxyacetophenone, 2,2-dimethoxy-2-phenylacetophenone, 2,2-dimethoxyacetophenone, 2,2-dibutoxyacetophenone, 2,2-dihexoxyacetophenone, 2,2-di(2-ethylhexoxy)acetophenone, 2,2-diphenoxyacetophenone, 2,2-ditolyloxyacetophenone, 2,2-di(chlorophenyl)acetophenone, 2,2-di(nitrophenyl) acetophenone, 2,2-diphenoxy-2-phenylacetophenone, 2,2-dimethoxy-2-methylacetophenone, 2,2-dipropoxy-2-hexylacetophenone, 2,2-diphenoxy-2-ethylacetophenone, 2,2-dimethoxy-2-cyclopentylacetophenone, 2,2-dipentoxy-2-cyclohexylacetophenone, 2,2-di(2-ethylhexyl)-2-cyclopentylacetophenone, 2,2-diphenoxy-2-cyclopentylacetophenone, 2,2-di(nitrophenoxy)-2-cyclohexylacetophenone, 2- or 3-chlorothioxanthone, xanthone, thioxanthone, acetophenone, propiophenone, benzophenone, fluorenone, benzaldehyde, anthraquinone, triphenylamine, carbazole, 2- or 3- or 4-methylacetophenone, 2- or 3- or 4-methoxyacetophenone, 2- or 3- or 4-bromoacetophenone, 3- or 4-allylacetophenone, 3,3'- or 3,4'- or 4,4'-dimethoxybenzophenone, 4-chloro-4'-benzyl-benzophenone, 3- or 9-dichloroxanthone, 2- or 3-chloroxanthone, 3-chloro-8-nonylxanthone, 3-methoxyxanthone, 3-iodoxanthone, 2-acetyl-4-methylphenyl acetate, benzoin, the alkyl and aryl ethers of benzoin, 1,3-diphenylacetone, and any of the other known photoiniators can be used in an amount sufficient to photoinitiate the reaction.

It has also been known that an activator can be used in conjunction with the photoinitiator and that in some instances a synergistic effect is observed. These activators are employed at concentrations of from 0.1 to 10 weight percent, preferably from 0.5 to 5 weight percent, of the total composition. Illustrative thereof one can mention methylamine, diisopropylamine, tributylamine, decylamine, tri-2-chloroethylamine, ethanolamine, triethanolamine, methyldiethanolamine, 2-aminoethylethanolamine, allylamine, cyclohexylamine, cyclopentadienylamine, diphenylamine, ditolylamine, trixylamine, tribenzylamine, N-cyclohexylethyleneimine, piperidine, 2-methylpiperidine, N-ethylpiperidine, 1,2-3,4-tetrahydropyridine, 2- or 3- or 4 -picoline, morpholine, N-methylmorpholine, piperazine, N-methylpiperazine, 2,2-dimethyl-1,3-bis[3-(N-morpholinyl)propionyloxy]propane, 1,5-bis[3-(N-morpholinyl)propionyloxy] diethyl ether, and any of the other known activators. One can use a single photoinitiator and a single activator, or one can use mixtures of two or more of either or both.

The polymerizable epoxide-modified reaction product mixtures can be used to prepare formulations with other oligomers, polymers, or monomers to produce formulated compositions. Indicative of monomers that can be used in preparing the formulations one can mention those containing at least one acrylyl or methacrylyl group in the molecule. Illustrative thereof are acrylic acid, acrylamide, methyl acrylate, ethyl acrylate, hexyl acrylate, 2-ethylhexyl acrylate, butoxyethoxyethyl acrylate, neopentyl glycol diacrylate, bicyclo[2.2.1]hept-2-yl acrylate, dicyclopentenyl acrylate, pentaerythritol mono- or di- or triacrylate or mixtures thereof, isodecyl acrylate, trimethylolpropane mono- or di- or triacrylate or mixtures thereof, 2-phenoxyethyl acrylate, glycidyl acrylate, 2-ethoxyethyl acrylate, 2-methoxyethyl acrylate, 2-(N,N-diethylamino)ethyl acrylate, omega-methoxyethyl (hendecaoxyethylene) acrylate, omega-tridecoxyethyl(hendecaoxyethylene) acrylate, trimethoxyallyloxymethyl acrylate, bicyclo [2.2.1] hept-2-en-5-ylmethyl acrylate, ethylene glycol diacrylate, bicyclo [2.2.1] hept-2-en-5,6-diyl diacrylate, vinyl acrylate, 2-hydroxypropyl acrylate, 2-hydroxyethyl acrylate, acrylated epoxidized soybean oil, acrylated epoxidized linseed oil, (methyl carbamyl)ethyl acrylate, the reaction product of an aromatic or aliphatic polyisocyanate (such as tolylene diisocyanate) with a hydroxyalkyl acrylate (such as 2-hydroxyethyl acrylate or 2-hydroxypropyl acrylate). The acrylyl compounds are well-known and the above discussion is only illustrative; any photocurable compound containing the acrylyl group is suitable for use.

Suitable methacrylyl compounds are the methacrylates of the above-identified acrylates.

Any other polymerizable monomer containing at least one polymerizable ethylenically unsaturated group of the structure $>C=C<$ can also be used, and illustrated thereof one can mention the nitriles such as acrylonitrile and methacrylonitrile; the olefins such as dodecene, styrene, 3-methylstyrene, alphamethylstyrene, cyclopentadiene, dicyclopentadiene, butadiene, 1,4-hexadiene, 4-methyl-1-pentene, bicyclo [2.2.1] hept-2-ene, bicyclo [2.2.1] hept-2,5-diene, cyclohexene; the vinyl halides such as vinyl chloride, vinylidene chloride; the vinyl esters such as vinyl acetate, vinyl butyrate, vinyl benzoate, vinyl butyral, vinyl methacrylate, vinyl hepto, vinyl crotonate; the vinyl ketones such as vinyl methyl ketone, vinyl phenyl ketone, isopropenyl methyl ketone, divinyl ketone, alpha-chloro-vinyl methyl ketone, vinyl phenyl ketone; acrolein and methacrolein; the vinyl ethers and thioethers such as methyl vinyl ether, ethyl vinyl ether, divinyl ether, isopropyl vinyl ether, the butyl vinyl ethers, 2-ethylhexyl vinyl ether, vinyl 2-chloroethyl ether, vinyl 2-methoxyethyl ether, n-hexadecyl vinyl ether, vinyl methyl sulfide, vinyl ethyl sulfide, divinyl sulfide, 1-chloroethyl vinyl sulfide, vinyl octadecyl sulfide, vinyl 2-ethoxyethyl sulfide, vinyl phenyl sulfide, diallyl sulfide; the miscellaneous sulfur and nitrogen containing monomers such as divinyl sulfone, vinyl ethyl sulfone, vinyl sulfonic acid, vinyl ethyl sulfoxide, sodium vinyl sulfonate, vinyl sulfonamide, vinyl pyridine, N-vinyl pyrollidone, N-vinyl carbazole. Other photocurable monomers are readily apparent to one skilled in the art.

The specific monomers mentioned are illustrative only and not all-inclusive. They can be used individually with the reaction product mixtures of this invention or two or more thereof can be employed dependent upon the desires of the individual. The preferred monomers and oligomers are the acrylyl compounds.

As previously indicated formulations of our polymerizable epoxide-modified reaction product mixtures can also be made with other polymers. Among the polymers that can be used one can include, for example, the polyolefins, and modified polyolefins, the vinyl polymers, the polyethers, the polyesters, the polyactones, the polyamides, the polyurethanes, the polyureas, the polysiloxanes, the polysulfides, the polysulfones, the polyformaldehydes, the phenolformaldehyde polymers, the natural and modified natural polymers, the heterocyclic polymers.

The term polymer as used herein includes the homopolymers and copolymers and includes the olefin polymers and copolymers such as polyethylene, poly(ethylene/propylene), poly-(ethylene/norbornadiene), poly(ethylene/vinyl acetate), poly(ethylene/vinyl chloride), poly(ethylene/ethyl acrylate), poly(ethylene/acrylonitrile), poly(ethylene/acrylic acid), poly(ethylene/styrene), poly(ethylene/vinyl ethyl ether), poly(ethylene/vinyl methyl ketone), polybutadiene, poly(butadiene/styrene/acrylonitrile), poly(vinylchloride), poly(vinylidene chloride), poly(vinyl acetate), poly(vinyl methyl ether), poly(vinyl methyl ketone), poly(allyl alcohol), poly(vinylpyrrolidone, poly(vinyl butyral), polystyrene, poly(N-vinyl-carbazole), poly(acrylic acid), poly(methyl acrylate), poly(ethyl acrylate), polyacrylonitrile, polyacrylamide, poly(methacrylic acid), poly(methyl methacrylate), poly(ethyl methacrylate), poly(N,N-dimethyl acrylamide), poly)methacrylamide, polycaprolactone, polycaprolactone/vinyl chloride), poly(ethylene glycol terephthalate), poly(caprolactam), poly(ethylene oxide), poly(propylene oxide), copolymers of ethylene oxide and propylene oxide with starters containing reactive hydrogen atoms such as the mixed copolymer using ethylene glycol or glycerol or sucrose, etc., as starter, the natural and modified natural polymers such as gutta percha, cellulose, methyl cellulose, starch, silk, wool, and the siloxane polymers and copolymers, the polysulfides and polysulfones, the formaldehyde polymers such as polyformaldehyde, formaldehyde resins such as phenol-formaldehyde, melamineformaldehyde, urea-formaldehyde, anilineformaldehyde and acetone-formaldehyde.

Also useful are the low molecular weight urethane oligomers containing free reactive acrylyl or methacrylyl groups such as are disclosed for example, in U.S. Pat. No. 3,509,234 and German Offenlegungsschrift No. 2103870.0.

The polymers can be used individually with the polymerizable epoxide-modified reaction product mixtures of this invention or two or more thereof can be utilized. One can also employ combinations of monomers, oligomers and polymers in conjunction with the polymerizable epoxide-modified reaction product mixtures in producing the formulations.

When formulations are produced, the amount of polymerizable epoxide-modified reaction product mixture of this invention present therein can vary from 1 to 80 weight percent, preferably from 15 to 60 weight percent of the total composition. Any of the inks or coatings containing the polymerizable epoxide-modified reaction product mixture of this invention can also contain pigments or colorants, antistats, dyes, stabilizers, fungicides, bactericides, photoinitiators, photosensitizers, activators, and other conventional additives in the known conventional amounts.

The compositions of this invention can be applied to a substrate for use as a coating or for use as a printing ink. After application they can be cured by exposure to electron beam radiation or ultraviolet light radiation. The methods of cure are well known to those skilled in the art and a detailed explanation is not necessary here. One particularly satisfactory process for curing is that described and claimed in U.S. Pat. No. 3,840,448 (issued Oct. 8, 1974), incorporated herein by reference.

EXAMPLE 1

A 1 liter four-necked reaction flask was fitted with a stirrer, thermometer, condenser and purge tube. To this reactor there were charged 200 grams of epoxidized soybean oil having an average of 7 percent oxirane, 48.4 grams of 2-(3,4-epoxycyclohexyl)-5,5-spiro (3,4-epoxycyclohexane)-m-dioxane, and 0.3 gram of tridecyl phosphite. The mixture was heated at 90° C for 0.75 hour under a nitrogen atmosphere. At the end of this period air was purged through the reaction flask and 83 grams of glacial acrylic acid, 4.32 grams of a 50% aqueous solution of potassium hydroxide and 0.32 gram of para-methoxyphenol were added and the reaction mixture was heated for an additional 6 hours at 110° to 120° C. The polymerizable epoxide-modified reaction product mixture produced had a residual acrylic acid level below 1 percent.

EXAMPLE 2

A reactor, as described in Example 1, was charged with 200 grams of epoxidized soybean oil having an average of 7 percent oxirane, 20 grams of 2-(3,4-epoxycyclohexyl)-5,5-spiro(3,4-epoxy-cyclohexane)-m-dioxane, 70 grams of acrylic acid, 1 gram of potassium hydroxide and 0.06 gram of para-methoxyphenol. While purging with air, the reaction mixture was heated to 110° to 120° C. over a 45 minute period; heating was then continued for an additional four hours at this temperature until the residual acrylic content was about 3 percent. The liquid polymerizable epoxide-modified reaction product mixture produced had a Brookfield viscosity of 1,032 poise at room temperature.

EXAMPLE 3

A reactor, similar to that disclosed in Example 1, was charged with 500 grams of epoxidized tall oil having an average of about 4 weight percent oxirane, 45 grams of acrylic acid, 2 grams of potassium hydroxide and 0.32 grams of para-methoxyphenol and the mixture was heated to about 110° C. over a 45 minute period while purging with air. Heating was continued for an additional 4 hours at 112° to 120° C. until the residual acid content was 0.7 percent.

EXAMPLE 4

A reactor, as described in Example 1, was charged with 241.1 grams of linseed oil epoxide having an average of 9 percent oxirane, 48.4 grams of 2-(3,4-epoxycyclohexyl)-5,5-spiro(3,4-epoxycyclohexane)-m-dioxane, 10 grams of mixed $C_{14}$-$C_{16}$ alpha olefin epoxides and 0.3 gram of tridecyl phosphite. The contents were stirred and heated under nitrogen over a 30 minute period to about 80° C.; then heating was continued for an additional 1 hour under nitrogen at 82° to 100° C. The mixture was cooled to about 40° C., purged with air and 0.6 gram of para-methoxyphenol, 86 grams of acrylic acid, 2.3 grams potassium hydroxide and 2.3 grams of water were added. The temperature was raised to 100° C. over a 30 minute period and the mixture was stirred to about 100° to 120° C. for 4¾ hours and then overnight at room temperature while continually purging with air. The following morning the reaction mixture was heated at 118° C. for about 1 hour until the residual acrylic acid content was 0.41 percent. The polymerizable epoxide-modified reaction product mixture produced was liquid and had a Brookfield viscosity of 6,000 poises.

EXAMPLE 5

A reactor, equipped as described in Example 1, was charged with 100 grams of epoxidized tall oil, having an average of 5 percent oxirane, 50 grams of 2-(3,4-epoxycyclohexyl)-5,5-spiro(3,4-epoxycyclohexane)-m-dioxane, and one gram of triphenyl phosphine. This mixture was stirred at from about 75° to 82° C. under nitrogen for about 1 hour. Thereafter, 0.08 gram of paramethoxy-phenol, 37 grams of acrylic acid and 0.6 grams of potassium hydroxide were added and the mixture was stirred with an air purge at 112° to 115° C. for about 3.5 hours. Stirring was continued overnight, under air, at room temperature. The following morning the reaction mixture was heated at 112° to 114° C. for about 2½ hours, with an air purge, until the residual acid content was 0.34 percent. The polymerizable epoxide-modified reaction product mixture had a Brookfield viscosity of 3,000 poises.

The polymerizable epoxide-modified reaction product mixtures produced in Examples 1, 2, 3 and 5 were formulated, films applied to steel panels and then cured by exposure to ultraviolet light radiation with initial exposure under nitrogen to radiation of 2,537 Angstroms followed by exposure in air to radiation from three 100 watts per inch medium pressure mercury (MPHG) lamps. The data is presented below:

| Formulations: | 1 | 2 | 3 | 5 |
|---|---|---|---|---|
| g. Product used | 10 | 5 | 10 | 10 |
| Pentaeythritol triacylate, g | — | 2 | — | — |
| Neopentyl glycol diacrylate, g | — | — | 4 | 4 |
| Diethoxyacetophenone, g | 0.14 | 0.05 | 0.14 | 0.14 |
| Exposure times, sec. | | | | |
| 2,537 Angstroms | 1.8 | 0.9 | 1.8 | 1.8 |
| M P H G | 1.5 | 0.75 | 1.5 | 1.5 |

Under these conditions all formulations cured to hard dry films.

EXAMPLE 6

A series of polymerizable epoxide-modified reaction product mixtures was produced using the following reactants:

| Run | 1 | 2 | 3 |
|---|---|---|---|
| EPO, g. | 200 | 200 | 200 |
| Diepoxide A,g. | — | 20 | — |
| Diepoxide, B, g. | 20 | — | — |
| Acrylic Acid, g. | 41 | 40 | 65 |
| Triphenyl phosphine, g | 0.8 | 0.85 | 2 |
| Potassium hydroxide, g | 0.4 | — | 1.2 |
| Potassium acetate, g | — | 0.75 | — |
| Bisphenol-A, g. | — | 10 | 10 |
| MMEHQ | 0.04 | 0.04 | 0.07 |

EPO-epoxidized soybean oil, 7 percent oxirane
Diepoxide A-2-(3,4-epoxycyclohexyl)-5,5-spiro(3,4-epoxy-cyclohexane)-m-dioxane
Diepoxide B-2,2-bis[p-(2,3-epoxypropoxy)phenyl]propane
MMEHQ-monomethyl ether of hydroquinone The reaction in Run 1 was carried out by charging the EPO, the Diepoxide B and triphenyl phosphine to the reactor; heating at 90° C. under nitrogen for 1 hour, purging with air, followed by addition at 90° C. of the acrylic acid and potassium hydroxide catalyst and MMEHQ and reacting at 110° to 120° C. for about 3 hours.

The reaction in Run 2 was carried out in the same manner as Run 1 using Diepoxide A with the Bisphenol-A added at the said time the acrylic acid was added.

The reaction in Run 3 was carried out in the same manner as Run 2 with the Bisphenol-A added at 110° C. rather than at 90° C.

Formulations were produced with each of the above reaction product mixtures. Each formulation contained 10 grams of the polymerizable epoxide-modified reaction product mixture, 5 grams of neopentyl glycol diacrylate, 2.5 grams of 2-hydroxyethyl acrylate, 2.5 grams of 2-ethylhexyl acrylate and 0.2 gram of 2,2-diethoxyacetophenone. Each formulation was applied to a steel panel with a No. 20 wire-wound rod and cured by exposure to ultraviolet light radiation; initially for 3.6 seconds to 2,537 Angstrom radiation under nitrogen and then for 2.95 seconds to radiation from three 100 watts/inch medium pressure mercury lamps in air. The compositions were also cured by initially exposing for 0.7 second to 2,537 Angstrom radiation under nitrogen and then for 0.6 seconds to the same medium pressure mercury lamps in air. All of the formulations cured to dry, non-tacky coatings.

EXAMPLE 7

A reactor, similar to that described in Example 1, was charged with 200 grams of 2(3,4-epoxycyclohexyl)-5,5-spiro(3,4-epoxycyclohexane)-m-dioxane, and 4 grams of triphenylphosphine and the mixture was heated under a nitrogen purge to 90° C. over a 1 hour period. Thereafter the purge was changed to air and 89.2 grams of glacial acrylic acid, 2 grams of potassium hydroxide and 0.2 grams of paramethoxyphenol was added and the mixture was heated for about 4 hours at between 100° to 110° C. At the end of this period the reaction was stopped because the reaction product mixture started to solidify; the composition was recovered as a solid product. This product was used to prepare a formulation by adding one gram thereof to 10 grams of the polymerizable epoxide-modified reaction product mixture of Run 5 of Example 6, 5 grams of neopentyl glycol diacrylate, 2.5 grams of 2-hydroxypropyl acrylate, 2.5 grams of 2-ethylhexyl acrylate and 0.21 gram of 2,2-diethoxyacetophenone. The formulation was applied to steel panels and cured by the two procedures described in Example 6; in all instances rapid cure to dry, tack-free coatings was achieved.

EXAMPLE 8

A series of polymerizable epoxide-modified reaction product mixtures was produced using the reactants set forth in the following table. In this table, Run 1 corresponds to Run 2 of Example 6.

In this series, all of the reactants except the acrylic acid, catalyst and MMEHQ were initially charged to the reactor. The contents were heated at 80° to 90° C. for 1 hour under nitrogen and then the mixture was purged with air at which time a solution of the acrylic acid, catalyst and MMEHQ was added at 80° C. and the reaction was continued for about 3 hours at 110° to 120° C. while continually purging with air.

| RUN | 1 | 2 | 3 | 4 | 5 | 6 | 7 | 8 | 9 | 10 | 11 |
|---|---|---|---|---|---|---|---|---|---|---|---|
| EPO, g. | 200 | — | — | — | 150 | 210 | 200 | 200 | 200 | 200 | 200 |
| LOE, g. | — | — | 120 | 150 | — | — | — | — | — | — | — |
| Diepoxide A, g. | 20 | — | 20 | — | — | 40 | 10 | — | 40 | 40 | 30 |
| Epoxide B, g. | — | 113 | 50 | 50 | — | 20 | 20 | — | — | 20 | — |
| Diepoxide C, g. | — | — | — | — | 70 | — | — | — | — | — | — |
| Acrylic Acid, g. | 40 | 36 | 47.5 | 48 | 47 | 65.8 | 49 | 37 | 57 | 63 | 54 |
| Bisphenol-A, g. | 10 | — | — | — | — | 10 | 10 | 10 | — | — | — |
| Potassium Acetate, g | 0.75 | 0.66 | 0.86 | 0.86 | — | — | — | — | — | — | — |
| Potassium Hydride | — | — | — | — | 0.49 | 0.7 | 0.7 | 0.7 | 0.7 | 0.7 | 0.65 |
| MMEHQ 1 g | 0.04 | 0.03 | 0.05 | 0.05 | 0.05 | 0.07 | 0.07 | 0.07 | 0.07 | 0.07 | 0.065 |
| Triphenyl phosphine, g | 0.85 | 1.3 | 1 | 1 | 0.8 | 1.3 | 1.2 | 1.1 | 1.3 | 1.5 | 1.3 |

EPO - epoxidized soybean oil, 7 percent oxirane
LOE - epoxidized linseed oil, 9 percent oxirane
Diepoxide A - 2-(3,4-epoxycyclohexyl)-5,5-spiro(3,4-epoxycyclohexane)-m-dioxane
Epoxide B - epoxides of mixed $C_{14}$-$C_{16}$ alpha-olefins.
Diepoxide C - 2-ethylhexylepoxyphthalate Formulations were produced with each of the above reaction product mixtures. Each formulation contained 69.44 grams of the polymerizable epoxide-modified reaction product mixture, 23.15 grams of pentaerithrytol triacrylate, 6.48 grams of benzophenone and 0.93 grams of p,p′-dimethylaminobenzophenone. Each formulation was applied to a steel panel with a No. 3 wire-wound rod and cured by air exposure for 2.2 seconds to ultraviolet light radiation from three 100 watts per inch medium pressure mercury lamps. The formulations of Runs 4, 6, 9, 10 and 11 cured to dry films; the others were tacky to the touch, however, they cure to dry film on further radiation.

EXAMPLE 9

A series of polymerizable epoxide-modified reaction product mixtures was produced using the reactants set forth in the following table. The procedure used in this series was the same as that described in Example 8, with the exception that in those runs in which triphenyl phosphine was absent, the reaction mixture ws not purged with nitrogen.

Runs 4 and 7, which were still wet to the touch; however, these cure to dry films on further radiation.

| Run | RPM g. | PETA g. | Bz g. | DMABz g. |
|---|---|---|---|---|
| 1 | 6 | 2 | 0.56 | 0.08 |
| 2 | 6 | 2 | 0.56 | 0.08 |
| 3 | 6 | 2 | 0.56 | 0.08 |
| 4 | 4 | — | 0.28 | 0.04 |
| 5 | 6 | 2 | 0.56 | 0.08 |
| 6 | 6 | 2 | 0.56 | 0.08 |
| 7 | 4 | — | 0.28 | 0.04 |
| 8 | 6 | 2 | 0.56 | 0.08 |
| 9 | 6 | 2 | 0.56 | 0.08 |
| 10 | 6 | 2 | 0.56 | 0.08 |

EXAMPLE 10

In a manner similar to that described in Example 8, a series of polymerizable epoxide-modified reaction product mixtures was produced using the reactants set forth in the following table. Run 5 of this series shows a modification of this invention wherein a mixture of two aliphatic epoxides is reacted in the absence of either an

| RUN | 1 | 2 | 3 | 4 | 5 | 6 | 7 | 8 | 9 | 10 |
|---|---|---|---|---|---|---|---|---|---|---|
| EPO, g. | — | 208 | 206 | — | 207 | 5 | — | — | 160 | 211 |
| LOE, g. | 160 | — | — | — | — | 204 | — | 215 | — | — |
| EP-8, g. | — | — | — | 200 | 50 | 100 | 208 | 100 | — | — |
| Diepoxide A, g. | — | — | — | 40 | 45 | — | — | 30 | — | — |
| Diepoxide B, g. | 40 | — | — | — | — | — | — | — | 40 | — |
| Epoxide C, g. | — | — | — | — | — | — | 100 | — | — | — |
| Bisphenol-S, g. | — | — | — | — | — | — | — | — | — | 10 |
| Acrylic Acid, g. | 55.4 | 34 | 34 | 33 | 65 | 60 | 47 | 76 | 54.3 | 34 |
| Phenol, g. | — | 15 | — | — | — | — | — | — | — | — |
| MMEHQ, g. | 0.06 | 0.04 | 0.04 | 0.04 | 0.08 | 0.07 | 0.09 | 0.09 | 0.06 | 0.04 |
| Tetrahydrophthalic-anhydride, g. | — | — | 10 | — | — | — | — | — | — | — |
| Potassium hydroxide, g. | 0.61 | 0.5 | 0.5 | 0.4 | 0.8 | 0.7 | 0.9 | 0.9 | 0.6 | 0.5 |
| Triphenyl phosphine, g. | 0.8 | — | — | 0.8 | 0.5 | 1.3 | 1 | 1.3 | — | — |

EPO - epoxidized soybean oil, 7 percent oxirane
LOE - epoxidized linseed oil, 9 percent oxirane
EP-8 - epoxidized tall oil, 5 percent oxirane
Diepoxide A - 2-(3,4-epoxycyclohexyl)-5,5-spiro(3,4-epoxycyclohexane)-m-dioxane
Diepoxide B - 3,4-epoxycyclohexylmethyl-3,4-epoxycyclohexane carboxylate
Epoxide C - epoxides of mixed $C_{14}$-$C_{16}$ alpha-olefins
Bisphenol S - bis(4-hydroxyphenyl)sulfone Formulations were produced, as shown below, with each of the above reaction product mixtures (RPM), benzophenone (Bz) and p,p′-dimethylaminobenzophenone (DMABz). In some instances pentaerythritol triacrylate (PETA) was also added. These formulations were applied to steel panels as described in Example 6. They were cured by the same procedure of Example 6, however, exposure times were 0.45 second to the 2,537 Angstrom radiation and 0.37 second to the medium pressure mercury lamp radiation. All formulations cured to dry, tack free films at these conditions except epoxycycloalkyl diepoxide or a diglycidyl compound.

| Run | 1 | 2 | 3 | 4 | 5 | 6 |
|---|---|---|---|---|---|---|
| EPO, g. | 200 | 200 | 200 | 200 | 50 | 100 |
| LOE, g. | — | — | — | — | 150 | 100 |
| Diepoxide A, g. | — | 20 | — | 15 | — | — |
| Diepoxide B, g. | 20 | 10 | 20 | — | — | 20 |
| Diepoxide C, g. | — | — | 20 | — | — | — |
| Bisphenol-A, g. | — | — | — | 10 | — | — |
| Acrylic Acid, g. | 70 | 70 | 75 | 65 | 43 | 42 |
| Potassium hydroxide, g. | 1 | 1 | 1.2 | 1.2 | 0.45 | 0.42 |
| Triphenyl phosphine, g. | 2 | 2 | 2 | 2 | 0.95 | 1 |

| Run | 1 | 2 | 3 | 4 | 5 | 6 |
|---|---|---|---|---|---|---|
| MMEHQ, g. | 0.06 | 0.06 | 0.07 | 0.07 | 0.045 | 0.043 |

EPO - epoxidized soybean oil, 7 percent oxirane
LOE - epoxidized linseed oil, 9 percent oxirane
Diepoxide A - 4-(1,2-epoxyethyl) - 1,2-epoxycyclohexane
Diepoxide B - 2-(3,4-epoxycyclohexyl)-5,5-spiro(3,4-epoxycyclohexane)-m-dioxane
Diepoxide C - 3,4-epoxycyclohexylmethyl-3,4-epoxycyclohexane carboxylate These reaction product mixtures were used to produce formulations with four different stock solutions. The stock solutions were mixtures of these acrylates in different weight proportions, as follows:

| Stock Solution | I | II | III | IV |
|---|---|---|---|---|
| Neopentyl glycol diacrylate | 42.8 | 50 | 57.1 | 50 |
| 2-Hydroxyethyl acrylate | 28.6 | 25 | 14.3 | 12.5 |
| 2-Ethylhexyl acrylate | 28.6 | 25 | 28.6 | 37.5 |

The formulations contained 10 grams of the specified Run of reaction product mixture produced above and indicated in the left hand column of the following table and 10 grams of the stock solution produced above and indicated across the top of the following table. A "yes" indicates the formulation of the two components was prepared; a "no" indicates the formulation was not prepared. All formulations contained one weight percent of 2,2-diethoxyacetophenone as photoinitiator.

| Stock Solution Run No. | I | II | III | IV |
|---|---|---|---|---|
| 1 | Yes | No | Yes | Yes |
| 2 | Yes | No | Yes | Yes |
| 3 | Yes | No | Yes | Yes |
| 4 | Yes | Yes | Yes | Yes |
| 5 | Yes | Yes | Yes | Yes |
| 6 | Yes | Yes | Yes | Yes |

All of the prepared formulations were applied to steel panels with a No. 20 wire-wound rod and cured as described in Example 6. A first set of panels was irradiated for 6.65 seconds and a second set of panels was irradiated for 1.3 seconds. All of the formulations cured to acceptable dry films having good acetone resistance, good adhesion and high 60° gloss values.

EXAMPLE 11

In a manner similar to that described in Example 8, a series of polymerizable epoxide-modified reaction product mixtures was produced using the reactants set forth in the following table.

| Run | 1 | 2 | 3 | 4 | 5 |
|---|---|---|---|---|---|
| EPO, g. | 72.7 | 70.9 | 84.0 | 67.6 | 57.6 |
| EP-8, g | — | — | — | 3.4 | 28.8 |
| Diepoxide A, g. | — | 10.2 | 10.2 | 10.1 | — |
| Bisphenol-A, g. | 3.7 | — | — | — | — |
| Acrylamide, g. | — | 3.4 | — | — | — |
| Phthalic anhydride, g. | — | — | 1.8 | — | — |
| Acrylic acid, g. | 23.6 | 18.4 | 18.4 | 18.9 | 13.5 |
| Triphenyl phosphine, g | 2 | 1.5 | 1.3 | 0.5 | 0.4 |
| Potassium hydroxide, g | 1.2 | 0.65 | 0.6 | 0.7 | 0.7 |
| MMEHQ, g | 0.07 | 0.065 | 0.06 | 0.1 | 0.1 |

EPO - epoxidized soybean oil, 7 percent oxirane
EP-8 - epoxidized tall oil, 5 percent oxirane
Diepoxide A- 2-(3,4-epoxycyclohexyl)-5,5-spiro (3,4-epoxycyclohexane)-m-dioxane In Run 1, the Bisphenol-A was added to the reaction mixture approximately one hour after all of the other reactants had been added and partially reacted at about 110° C. Then, the reaction was permitted to proceed to completion by further heating for another 6 hours at 110° to 125° C.

Ink formulations were prepared and tested as described infra for the compositions of Examples 13 to 15. All of the formulations cured to dry, tack-free films.

EXAMPLE 12

A series of polymerizable epoxide-modified reaction product mixtures was produced, in a manner similar to that described in Example 8, using the reactants set forth in the following table. This series shows reaction of the aliphatic epoxide with a comodifier in the absence of the diepoxide in Runs 1, 2 and 3; a further modification of our invention.

| RUN | 1 | 2 | 3 | 4 |
|---|---|---|---|---|
| EPO, g. | 78.4 | 77.2 | 65.8 | 69.0 |
| Diepoxide A, g. | — | — | — | 3.4 |
| Diepoxide B, g. | — | — | — | 3.4 |
| Diepoxide C, g. | — | — | — | 3.4 |
| Acrylic Acid, g. | 12.6 | 17.8 | 21.0 | 20.8 |
| Acrylamide, g. | 9.0 | — | — | — |
| Bisphenol-A, g. | — | 5.0 | 13.2 | — |
| Triphenyl phosphine, g | 0.5 | 1 | 2 | 2 |
| Potassium hydroxide, g | 0.3 | 0.5 | 1 | 1 |
| MMEHQ, g | 0.03 | 0.05 | 0.06 | 0.06 |

EPO - epoxidized soybean oil, 7 percent oxirane
Diepoxide A - 4-(1,2-epoxyethyl)-1,2-epoxycyclohexane
Diepoxide B - 3,4-epoxycyclohexylmethyl-3,4-epoxycyclohexane carboxylate
Diepoxide C - 2-(3,4-epoxycyclohexyl)-5,5-spiro(3,4-expoxycyclohexane)-m-dioxane Runs 3 and 4 were carried out in a manner similar to that described in Example 8. In Run 1, the acrylamide was added to the reaction mixture at 110° C. approximately 1 hour after all of the other reactants had been added to the reactor and partially reacted. In Run 2 the Bisphenol-A was added to the reaction mixture at 120° C. approximately one-half hour after all of the other reactants had been added to the reactor and partially reacted.

EXAMPLE 13

To a reactor there were charged 5,007 grams of epoxidized soybean oil having an average of 7 percent oxirane, 625 grams 2-(3,4-epoxycyclohexyl)-5,5-spiro (3,4-epoxycyclohexane)-m-dioxane, 125 grams of phthalic anhydride, 1,300 grams of glacial acrylic acid and 3.75 grams of the monomethyl ether of hydroquinone. While purging with air, the mixture was heated to 40° C., at which time 70 grams of a 50 percent aqueous potassium hydroxide solution was added. It was then heated to about 90°, at which point an exotherm occurred, and stirring was continued at 105° to 120° C. for about 3.5 hours. The polymerizable epoxide-modified reaction product mixture had a residual acrylic acid level of less than 0.5 weight percent.

EXAMPLE 14

Following the procedure described in Example 13, a polymerizable epoxide-modified reaction product mixture was produced by the reaction of 5,200 grams of the same epoxidized soybean oil, 1,040 grams of 2-(3,4-epoxycyclohexyl)-5,5-spiro(3,4-epoxycyclohexane)-m-dioxane, 520 grams of a mixture of $C_{14}$-$C_{16}$ alpha-olefin epoxides, 1,638 grams of glacial acrylic acid, 4 grams of the monomethyl ether of hydroquinone using aqueous potassium hydroxide solution as catalyst. On completion of the reaction 0.8 gram of hydroquinone and 7.7 grams of triphenyl phosphite were added at 90° C.

EXAMPLE 15

In a procedure similar to that described in Example 13, 5,000 grams of epoxidized linseed oil having an average of 9 percent oxirane, 1,004 grams of 2-(3,4-epoxycyclohexyl)-5,5-spiro(3,4-epoxycyclohexane)-m-dioxane, 4.2 grams of monomethyl ether of hydroquinone and 1,602 grams of glacial acrylic acid were reacted in the presence of aqueous potassium hydroxide as catalyst. Upon completion of the reaction 0.8 gram of hydroquinone and 7.6 grams of triphenylphosphite were added at 90° C.

Formulated compositions were produced using the polymerizable epoxide-modified reaction product mixtures of Examples 13 to 15, Runs 1-3 respectively. These compositions contained 65 parts of the reaction product mixture, 13 parts of neopentyl glycol diacrylate, 13 parts of 2-hydroxypropyl acrylate, 8 parts of 2-ethylhexyl acrylate and 1 part of 2,2-diethoxyacetephenone. Similar formulated compositions were produced using unmodified acrylated epoxidized soybean oil (Run 4) and unmodified acrylated epoxidized linseed oil (Run 5), for comparative purposes. These formulations were applied as one mil wet films to the surface of steel panels and cured using the same equipment used in Example 6. The film hardnesses were as follows:

| Run | Sward Hardness After Total Exposure Time. sec. | |
|---|---|---|
| 1 | 3.8 | 1.65 |
|   | 20 | 20 |
| 2 | 18 | 16 |
| 3 | 26 | 26 |
| 4 | 12 | 10 |
| 5 | 16 | 12 |

The improved hardness of the coating compositions of this invention are readily apparent.

Ink formulations were also prepared using 58 parts of the reaction product mixture of Examples 13 to 15, 15 parts of pentaerythritol triacrylate, 10 parts of black pigment, 3 parts of blue pigment, 5 parts of petrolatum, 8.7 parts of benzophenone and 1.3 parts of Michler's ketone (Runs 1 to 3, respectively). For comparison, an ink was also produced using unmodified epoxidized linseed oil acrylate (Run 4). These inks were evaluated by applying with a Quick Peek Proofer to a constant color density and cured by exposure to ultraviolet radiation from two 200 watts per inch medium pressure mercury lamps in an air atmosphere and the time in seconds required for cure to a dry surface recorded:

| Run 1 | 0.5 second |
|---|---|
| Run 2 | 1.0 second |
| Run 3 | 0.4 second |
| Run 4 | 1.0 second |

Similar results were obtained on a slightly modified formulation cured with the equipment used in Example 6.

What is claimed is:

1. A polymerizable epoxide-modified composition comprising the reaction product mixture of the conjoint reaction of:
   (I) a vinylated carboxylic acid selected from the group consisting of:
      (a) acrylic acid, and
      (b) methacrylic acid; and
   (II) an aliphatic epoxide selected from the group consisting of:
      (a) an epoxide of a long chain unsaturated fatty acid, or the ester thereof, having an aliphatic chain of from 10 to 24 carbon atoms and at least one oxirane group, and
      (b) an epoxide of a long chain unsaturated fatty oil having esterified aliphatic acid chains of from 10 to 24 carbon atoms wherein at least one of said esterified chains contains an oxirane group; and
   (III) a diepoxide selected from the group consisting of:
      (a) an epoxycycloalkyl diepoxide having at least one epoxycycloalkyl group wherein said cycloalkyl group has 5 or 6 ring carbon atoms, and
      (b) a diglycidyl compound wherein the glycidyl group is attached to a phenyl group via a —O— link, and
   (IV) a reactive-group-containing modifier selected from the group consisting of:
      (a) aromatic and aliphatic carboxylic acids wherein the aromatic group has 6 ring carbon atoms and the aliphatic chain has from 2 to 10 carbon atoms,
      (b) the anhydrides of the carboxylic acids of (IV) (a),
      (c) a phenol,
      (d) an aromatic or aliphatic alcohol having from 1 to 10 carbon atoms,
      (e) an aliphatic carboxylic acid amide having from 2 to 10 carbon atoms in the aliphatic chain, and
      (f) an aliphatic carboxylic acid halide having from 2 to 15 carbon atoms in the aliphatic chain,
wherein in said polymerizable composition the amount of reacted component (II) is from 0.1 to 1 oxirane group equivalent per carboxyl group equivalent present in component (I), the amount of reacted component (III) is from 0.1 to 1 oxirane group equivalent per carboxyl group equivalent of reacted component (I), the amount of reacted component (IV) is from 0 to 1 reactive group equivalent per carboxyl group equivalent of reacted component (I) and wherein the sum of the total reacted oxirane equivalents of components (II) and (III) plus the reacted group equivalents of component (IV) in said polymerizable composition is from 0.1 to 1 equivalent per reacted carboxyl equivalent of component (I).

2. A polymerizable epoxide-modified composition as claimed in claim 1, wherein the amount of reacted component (II) is from 0.5 to 1 oxirane equivalent per carboxyl group equivalent present in component (I).

3. A polymerizable epoxide-modified composition as claimed in claim 1, wherein the amount of reacted component (III) is from 0.5 to 1 oxirane equivalent per carboxyl group equivalent of reacted component (I).

4. A polymerizable epoxide-modified composition as claimed in claim 1, wherein the amount of reacted component (IV) is from 0.1 to 0.4 reactive group equivalent per carboxyl group equivalent of reacted component (I).

5. A polymerizable epoxide-modified composition as claimed in claim 1, wherein the amount of reacted component (II) is from 0.5 to 1 oxirane equivalent per carboxyl group equivalent present in component (I), the amount of reacted component (III) is from 0.5 to 1 oxirane equivalent per carboxyl group equivalent of reactant component (I), and the amount of reacted component (IV) is from 0.1 to 0.4 reactive group equivalent per carboxyl group equivalent of reacted component (I).

6. A polymerizable epoxide-modified composition as claimed in claim 1, wherein the sum of the total reacted oxirane equivalents of components (II) and (III) plus the reacted group equivalents of component (IV) in said polymerizable composition is from 0.5 to 0.9 equivalent per reacted carboxyl equivalent of component (I).

7. A polymerizable epoxide-modified composition as claimed in claim 1, wherein component (I) is acrylic acid.

8. A polymerizable epoxide-modified composition as claimed in claim 1, wherein component (I) is methacrylic acid.

9. A polymerizable epoxide-modified composition as claimed in claim 1, wherein component (II) is epoxidized linseed oil.

10. A polymerizable epoxide-modified composition as claimed in claim 1, wherein component (II) is epoxidized soybean oil.

11. A polymerizable epoxide-modified composition as claimed in claim 1, wherein component (III) is 2-(3,4-epoxycyclohexyl)5,5-spiro(3,4-epoxycyclohexane)-m-dioxane.

12. A polymerizable epoxide-modified composition as claimed in claim 1, wherein component (III) is 2,2-bis[p-(2,3-epoxypropoxy)phenyl] propane.

13. A polymerizable epoxide-modified composition as claimed in claim 1, wherein component (III) is 3,4-epoxycyclohexylmethyl-3,4-epoxycyclohexane carboxylate.

14. A polymerizable epoxide-modified composition as claimed in claim 1, wherein component (III) is 4-(1,2-epoxyethyl)-1,2-epoxycyclohexane.

15. A polymerizable epoxide-modified composition as claimed in claim 1, wherein component (IV) is bisphenol-A.

16. A polymerizable epoxide-modified composition as claimed in claim 1, wherein component (IV) is acrylamide.

17. A polymerizable epoxide-modified composition as claimed in claim 1, wherein component (IV) is phthalic anhydride.

18. A polymerizable epoxide-modified composition as claimed in claim 7, wherein component (II) is epoxidized soybean oil and component (III) is 2-(3,4-epoxycyclohexyl)-5,5-spiro(3,4-epoxycyclohexane)-m-dioxane.

19. A polymerizable epoxide-modified composition as claimed in claim 7, wherein component (II) is epoxidized soybean oil and component (III) is 2,2-bis[p-(2,3-epoxypropoxy)phenyl]propane.

20. A polymerizable epoxide-modified composition as claimed in claim 7, wherein component (II) is epoxidized soybean oil and component (III) is 3,4-epoxycyclohexylmethyl-3,4-epoxycyclohexane carboxylate.

21. A polymerizable epoxide-modified composition as claimed in claim 7, wherein component (II) is epoxidized soybean oil and component (III) is 4-(1,2-epoxyethyl)-1,2-epoxycyclohexane.

22. A polymerizable epoxide-modified composition as claimed in claim 7, wherein component (II) is epoxidized linseed oil and component (III) is 2-(3,4-epoxycyclohexyl)-5,5-spiro(3,4-epoxycyclohexane)-m-dioxane.

23. A polymerizable epoxide-modified composition as claimed in claim 7, wherein component (II) is epoxidized linseed oil and component (III) is 2,2-bis[p-(2,3-epoxypropoxy)phenyl]propane.

24. A polymerizable epoxide-modified composition as claimed in claim 7, wherein component (II) is epoxidized linseed oil and component (III) is 3,4-epoxycyclohexylmethyl-3,4-epoxycyclohexane carboxylate.

25. A polymerizable epoxide-modified composition as claimed in claim 7, wherein component (II) is epoxidized linseed oil and component (III) is 4-(1,2-epoxyethyl)-1,2-epoxycyclohexane.

* * * * *

UNITED STATES PATENT OFFICE
CERTIFICATE OF CORRECTION

Patent No. 4,119,640　　　　　　　　Dated 10/10/78

Inventor(s) L.E. Hodakowski, C.L. Osborn and E.B. Harris

It is certified that error appears in the above-identified patent and that said Letters Patent are hereby corrected as shown below:

Column 4, lines 15 to 19; the formula should read:

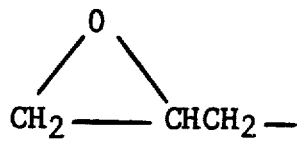

[SEAL]

Attest:

RUTH C. MASON
Attesting Officer

Signed and Sealed this

Sixth Day of March 1979

DONALD W. BANNER
Commissioner of Patents and Trademarks